United States Patent [19]
Caille et al.

[11] Patent Number: 5,206,655
[45] Date of Patent: Apr. 27, 1993

[54] HIGH-YIELD ACTIVE PRINTED-CIRCUIT ANTENNA SYSTEM FOR FREQUENCY-HOPPING SPACE RADAR

[75] Inventors: Gérard Caille, Tournefeuille; Jean-Louis Cazaux, Toulouse; Olivier Remondiere, Frouzins, all of France

[73] Assignee: Alcatel Espace, Courbevoie, France

[21] Appl. No.: 665,212

[22] Filed: Mar. 6, 1991

[30] Foreign Application Priority Data

Mar. 9, 1990 [FR] France ............................... 90 03027

[51] Int. Cl.$^5$ .................. H01Q 1/380; H01Q 21/060; H01Q 3/260
[52] U.S. Cl. .............................. 343/700 MS; 342/25; 342/368; 342/361; 343/853
[58] Field of Search .................. 342/25, 361, 368; 343/700 MS File, 853, 701

[56] References Cited

U.S. PATENT DOCUMENTS

| | | | |
|---|---|---|---|
| Re. 32,369 | 3/1987 | Stockton et al. | 343/700 MS |
| 4,490,719 | 12/1984 | Botwin et al. | 342/64 |
| 4,737,793 | 4/1988 | Munson et al. | 343/700 MS |
| 4,741,778 | 5/1988 | Horie et al. | 106/287.16 |
| 4,893,126 | 1/1990 | Evans | 343/700 MS |
| 4,987,425 | 1/1991 | Zahn et al. | 343/700 MS |

FOREIGN PATENT DOCUMENTS

| | | | |
|---|---|---|---|
| 0200819 | 11/1986 | European Pat. Off. | |
| 0325701 | 8/1989 | European Pat. Off. | |
| 0257284 | 10/1989 | Japan | 342/361 |
| 0216077 | 8/1990 | Japan | 342/25 |
| 8808623 | 11/1988 | World Int. Prop. O. | |
| 8902662 | 3/1989 | World Int. Prop. O. | |

OTHER PUBLICATIONS

Onde Electrique, vol. 69, No. 2, Mar. 1989, Paris, France, pp. 7-14; Pourailly and Guerin: "Avenir des antennes-réseaux actives—Active array antennas in the future".

Microwave Journal, vol. 31, No. 3, Mar. 1988, Dedham, USA, pp. 113-125; McIlvena; "Monolithic Phased Arrays for EHF Communications Terminals".

*Primary Examiner*—Rolf Hille
*Assistant Examiner*—Peter Toby Brown
*Attorney, Agent, or Firm*—Sughrue, Mion, Zinn, Macpeak & Seas

[57] ABSTRACT

A high-efficiency active printed-circuit antenna system for pulsed frequency-hopping space radar electronically scanned in two planes encompasses in its timing diagram the transmission of a horizontal polarization pulse, the reception of echoes from a previous horizontal polarization pulse, the transmission of a vertical polarization pulse and the reception of echoes from a previous vertical polarization pulse. The system comprises several thousand MMIC modules distributed over the antenna and each connected to a printed-circuit radiating element comprising a plurality of dual polarized square patches connected by microstrip lines which excite them with the same amplitude and the same phase at two perpendicular ports. Switching between the two ports procures transmission or reception with horizontal or vertical polarization.

10 Claims, 19 Drawing Sheets

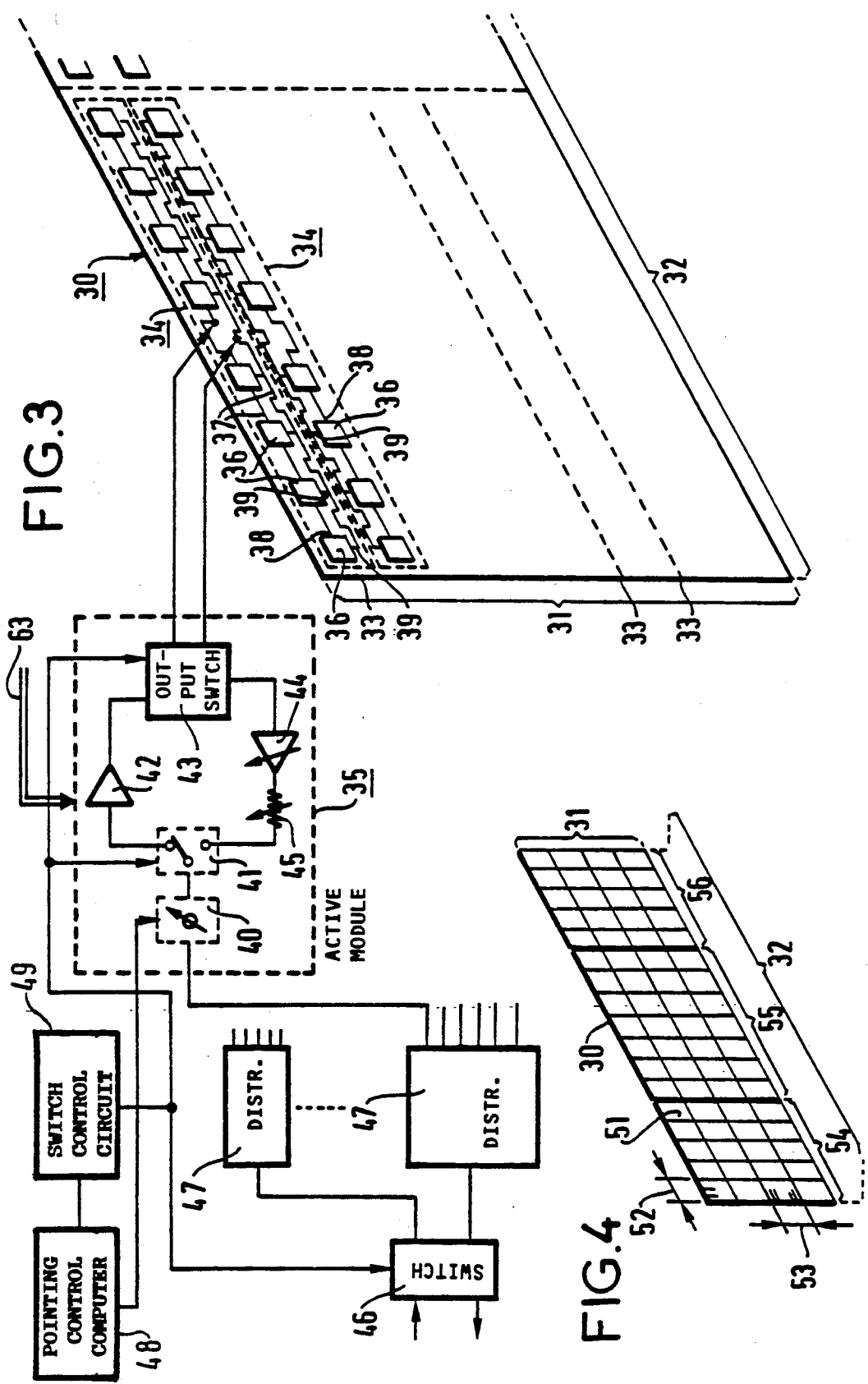

HIGH-YIELD ACTIVE PRINTED-CIRCUIT ANTENNA SYSTEM FOR FREQUENCY-HOPPING SPACE RADAR

BACKGROUND OF THE INVENTION

1. Field of the invention

The invention concerns a high-yield active printed-circuit antenna system for frequency-hopping space radar.

2. Description of the prior art

A sideways-looking SAR (Synthetic Aperture Radar) observation satellite can process echoes using the Doppler effect to obtain very fine image resolution in spite of the distance between the radar and the observed area but requires a very large antenna with two-dimensional electronic frequency agility, transmitting and receiving consecutively with two orthogonal linear polarizations.

A typical X band mission requires more than 6,000 phase control points on a 2×8 m antenna.

A centralized amplification system would have prohibitive losses and reduced reliability.

Space SAR antennas have already been implemented using two types of radiating element:

The European Space Agency ERS1 satellite antenna uses C band slot guides and a single V polarization ("pseudovertical" polarization perpendicular to the normal to the antenna), as described in the paper "The planar array antennas for ERS1" in "Proceedings of IGARSS 1988". Its beam is fixed, however, with no electronic scanning.

The antennas of the US Seasat, SIRA and B satellites are "patch" antennas made up of conductive areas ("patches") etched onto honeycomb material, resonating in the L band with a single H polarization (horizontal polarization, perpendicular to the normal to the antenna), as described in the paper "Seasat and SIRA microstrip antennas" in "Proceedings of Workshop on Printed Antenna Technology"—Las Cruces—1979". Their beam is fixed, however.

The SAR type SIR.C (Shuttle Imaging Radar) on the US space shuttle due to fly in 1991 or 1992 (see "Heading for space C. Band phased array" in "Microwave and RF" of April 1986) comprises:

an X band passive antenna using single polarization slot guides, two L and C band dual polarization active antennas.

Thus there is no X band active antenna or dual polarized antenna.

The prior art L and C band active antennas are scanned electronically in one plane only (elevation).

Additionally, the mass, thermal control and reliability constraints are less severe on the US shuttle; the transmit amplifiers use hybrid rather than monolithic technology, for example. The former technology involves a significant mass penalty.

Space SAR radars designed in France for terrestrial resource (vegetation, hydrology, oceanography) observation in particular must be able to operate in the X band (frequencies between 9.5 and 9.8 GHz) with both horizontal and vertical polarization.

The required radiating surface areas (height 2 to 3 m by length 7 to 10 m) rule out the juxtaposition on a satellite of different antennas, one for each polarization or one for transmission and the other for reception.

This French radar is a pulsed radar, successively transmitting a horizontal (H) polarization pulse, receiving echoes from a previous H pulse, transmitting a vertical (V) polarization pulse, and receiving echoes from a previous V pulse, as shown in the timing diagram (FIG. 1).

A duplicated switching system enables use of a single antenna scanned electronically in two planes and the whole surface of which is active for each of the previously mentioned four modes:

the printed-circuit radiating elements radiate (or receive) an electric field polarized either horizontally (H) or vertically (V) according to which of the two microstrip lines exciting the patches the port is switched to, switching between the transmit (high-power) amplifiers and the receive (low-noise) amplifiers enables use of the same phase shifters to scan and to form the antenna beam.

If a centralized amplifier is used as in most of the SAR radars previously described, the losses in the distribution circuits between the satellite platform and the radiating elements, in the phase shifters and in the duplicated switching system are prohibitive:

they degrade the receive noise factor;

the transmission of pulses requires 3 to 6 kW of power, according to the mission: the above losses mean that the power available at the output of the TWT (travelling wave tube) must be approximately doubled. There is not currently available any X band pulsed TWT for space applications rated at 6 to 12 kW; even if such a device were to be developed, its reliability would be limited.

SUMMARY OF THE INVENTION

The present invention consists in a high-yield active printed-circuit antenna system for pulsed frequency-hopping space radar electronically scanned in two planes, its timing diagram encompassing the transmission of a horizontal polarization pulse, the reception of echoes from a previous horizontal polarization pulse, the transmission of a vertical polarization pulse and the reception of echoes from a previous vertical polarization pulse, said system comprising several thousand MMIC modules distributed or spread over the antenna in a regular array and each connected to a printed-circuit radiating element comprising a plurality of dual polarized square patches connected by microstrip lines adapted to excite them with the same amplitude and the same phase at two perpendicular ports, switching between said two ports procuring transmission or reception with horizontal or vertical polarization.

This antenna system can be optimized according to the specific constraints for a satellite: mass, consumption, reliability, stowage within the launch vehicle fairing, etc.

The use of identical MMIC devices maximizes their efficiency and minimizes their peak power as well as enabling large-scale series manufacture at moderate cost.

The invention is advantageously applied to a two-dimensional (elevation+azimuth) scanning antenna system.

Very lightweight materials of sufficient stiffness are advantageously employed: adding a thermo-elastic decoupling system between primary and secondary mechanical structures enables deflections or deformations to be limited to less than 2 mm for an antenna larger than 8×2 m.

Thermal control is advantageously achieved by the use of super-insulation (i.e., multi-layer insulation or "MLI") on the rear and on the edges and a white radome, which has been coated with white paint, at the front, enabling the antenna temperature to be homogenized and maintained within close limits throughout the satellite orbit.

Deformations of the antenna are advantageously monitored by a laser sighting system and are compensated by phase shifters distributed over the antenna in very large numbers.

The amplification is preferably divided between active transmit-receive modules (Tx/Rx modules) which are sets of MMIC (Monolithic Microwave Integrated Circuit) chips on an alumina (insulative) substrate implementing the transmit and receive phase shifting, amplification and switching functions. These compact and extremely low weight devices are connected immediately behind the radiating elements.

The distribution system and phase shifter losses contribute very little to the radar link balance as they are operative prior to the transmit (power) amplification and after the receive (low-noise) amplification.

The only losses which play a major role are:
the losses in the printed-circuit radiating elements, which are low as the microwave signal paths in the radiating plane are less than 8 cm; and
the losses of the DPDT (double-pole/double-throw) switch which provides the duplicated switching system and has a single MMIC technology FET (Field-Effect Transistor) shunting each path, so that the losses are less than those of two series-connected SPDT (single-pole/-double-throw) switches in series.

Gallium arsenide MMIC HPA (high-power amplifiers) obtained from a commercial foundry at moderate cost for large-scale series manufacture cannot provide more than 1 W output power in the X band. This is compatible with the total power that the antenna has to radiate, provided that the amplifiers of all the Tx/Rx modules have the same power output.

If this total power varied with time and with the position of the antenna, the most heavily loaded amplifiers would need to output much more power, which would render their series manufacture highly critical. Also, amplifiers delivering less power would have a lower efficiency ($P_{out}-P_{in}/P_{DC}$) with the result that the antenna consumption would be higher; the consumption is one of the more critical parameters for this type of satellite.

A diagram synthesizer method is therefore used to scan the antenna lobe over the required observation area with a constant footprint on the ground (requiring the lobe width to be variable):
with uniform transmit illumination;
by presetting an attenuator on the output side of the receive LNA (low-noise amplifier) to four levels (dynamic range 2.8 dB) according to the location of the module on the antenna;
by commanding in flight only the phase shifters (on four bits).

The solution using equal-power amplifiers in a regular distribution greatly facilitates thermal control, which is another critical parameter for this type of antenna. Dissipation is uniform over the antenna (the energy dissipated in the receiver attenuators is negligible, given the signal level and the noise level received at the antenna). This would not be so:

in a solution in which the gain of the transmit system is varied at the antenna; or
in a solution whereby equal-power amplifiers were irregularly distributed over the antenna; the required amplitude law (essential to obtaining a diagram with low-level lobes) being then obtained by connecting an active module to more or less patches, depending on the antenna area concerned.

Finally, the presence of phase shifters distributed over all of the antenna allows in-flight correction of antenna deformations after measuring the latter by optical sighting or by measuring the propagation time of the microwave signal to a probe at the front of the antenna.

A system in accordance with the invention makes it possible to radiate a peak power of 4 to 6 kW with less than 1 W per amplifier and procures a very good receive noise factor. Reliability is excellent by virtue of the inherent redundancy of the system. Modular subdivision into subarrays facilitates manufacture, assembly, testing and repair on the ground where applicable.

Diagrams with varying direction and shape are synthesized by means of receive preset attenuators and phase shifters. The use of identical active modules in which all the amplifiers operate at the same transmit power makes it possible to reduce the cost and the consumption by minimizing the individual power and by maximizing efficiency.

The characteristics and advantages of the invention will emerge from the following description given by way of non-limiting example with reference to the appended diagrammatic drawings.

BRIEF DESCRIPTION OF THE DRAWINGS

FIG. 3 is a general block diagram of an antenna system in accordance with the invention.

FIGS. 4 through 13 show various parts of the antenna system.

DETAILED DESCRIPTION OF THE INVENTION

Figure 1:
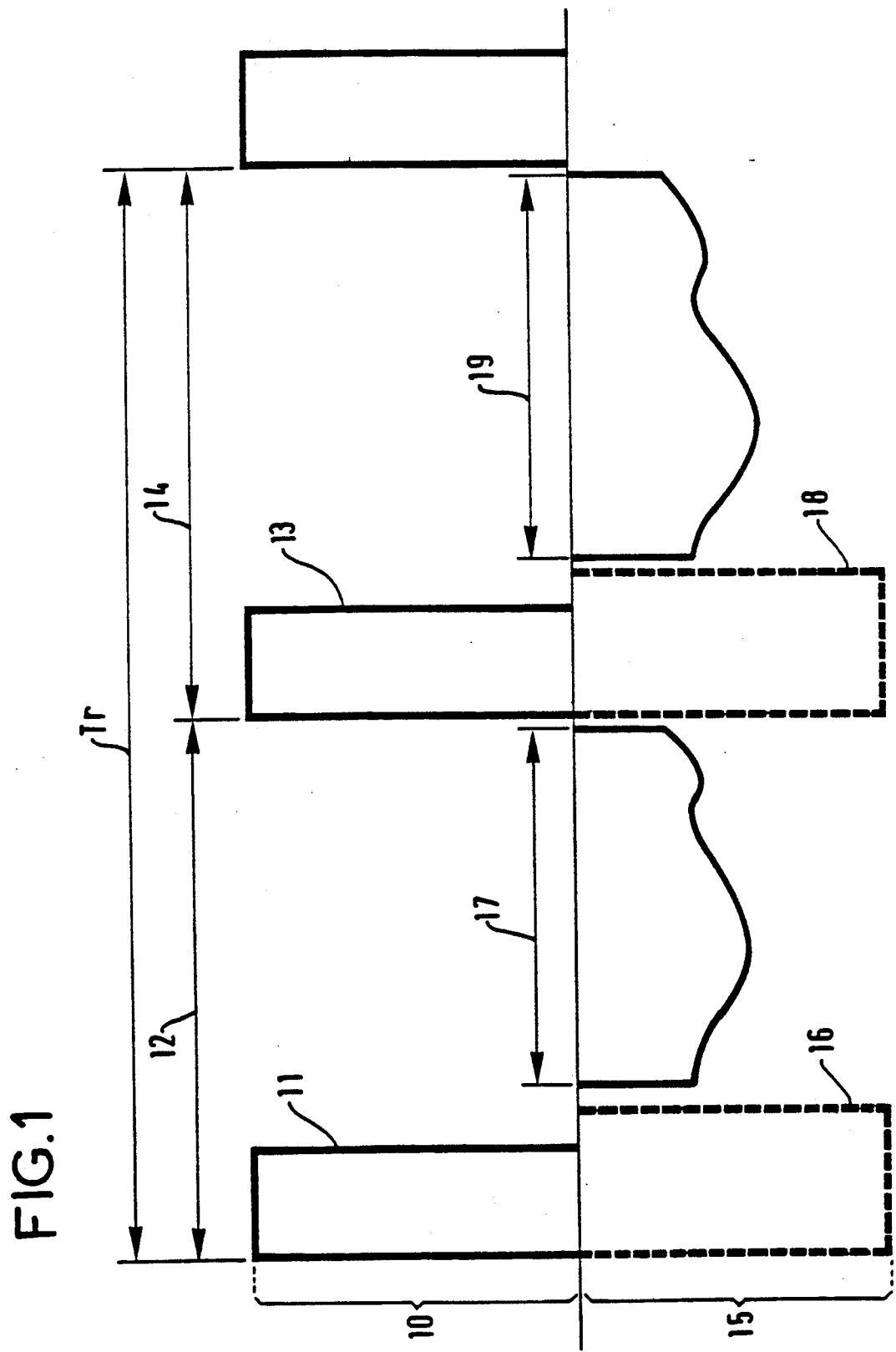
FIGS. 1 and 2 show the operation of an SAR radar.

FIG. 1 shows a typical SAR type radar timing diagram, which features:
a transmit part 10 comprising:
an H pulse 11 of 40 to 50 $\mu$s duration representing the horizontal (H) polarization transmission 12,
a V pulse 13 of 40 to 50 $\mu$s duration representing the vertical (V) polarization transmission 14 with a repetition period of:

$Tr=1/PRF$ ($\approx 2$ $Hz$)$\approx 500$ $\mu s$, and a receive part 15 comprising:
a nadir echo 16 of the yth previous pulse,
a usable H echo 17 of the xth previous pulse (spread along 20 km of usable width 23 of the strip of the earth's surface intercepted by a lobe of the beam) of 55 $\mu$s duration (minimal angle of attack) to 170 $\mu$s duration (maximal angle of attack),
another nadir echo 18, a usable V echo 19 of the xth previous pulse.

Figure 2:
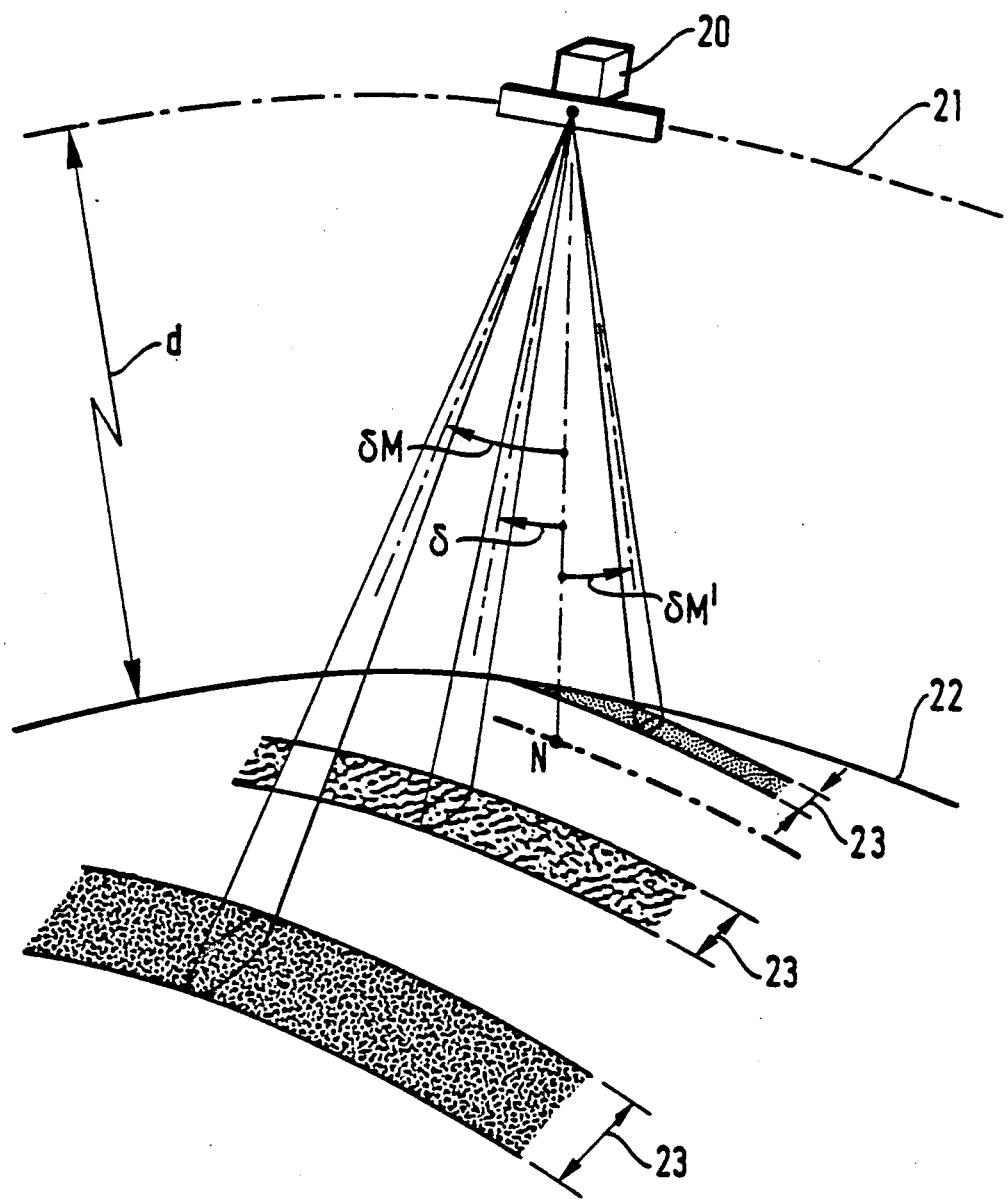

FIG. 2 is a schematic representation in elevation of the electronic scanning of the beam of an observation SAR satellite.

The satellite 20 is on an orbit 21 at a distance d (680 km, for example) from the earth 22, the point N indicating where the nadir axis (from the satellite to the center of the earth) intersects the earth's surface.

The total scan in elevation is, for example, 78°1: δ M=54°1 on one side and δ M'=24° on the other side of the nadir axis. The width 23 of the strip of the earth's surface intercepted by a lobe of the beam is approximately 20 kilometers.

FIG. 3 is a block diagram of a printed-circuit active antenna in accordance with the invention.

The exact dimensions of this example apply to a specific X band mission (radar signal bandwidth 100 MHz about 9.65 GHz) with quasi-continuous electronic scanning up to 45° from the antenna axis in the elevation plane (vertical plane passing through the normal to the antenna) and then ±1°15 to either side of said axis in the plane perpendicular to the elevation plane.

The specified level of the secondary lobes is −18 dB; as amplitude, phase and deformations errors contribute to raising the level of some secondary lobes, the target for the theoretical error-free diagrams is around −20 dB.

These specifications lead to an antenna 30 with a height 31 equal to 2.28 m and a length 32 equal to 8.16 m (i.e. a surface area of 18.6 m$^2$) comprising 128 lines 33 of 51 dual-polarized radiating elements 34 (i.e., a total of 6528 elements) each connected to an active module 35; the radiating element 34+active module 35 combinations are regularly distributed over the antenna, each occupying an area 1.88×16 cm.

The invention will be described in detail with reference to these specific numbers and dimensions; the general principles may be applied to different missions, however.

To distribute the power amplification and to improve the receive noise factor the GaAs MMIC technology Tx/Rx active modules 35 are distributed or spread on the antenna in a regular array, as illustrated. They implement the phase shifting, amplification and switching (transmit/receive and between polarizations) functions, are available at moderate cost in medium quantities and allow substantial miniaturization. Each is connected to a printed-circuit radiating element 34 comprising eight dual polarized square "patches" 36 (for a total of 8×51×128=52,224 patches and microstrip lines). These modules can be reproduced over a large surface area at moderate cost by photo-etching.

The dual polarized square patches 36 are conductive areas deposited onto a single insulative substrate. The patches connected in groups of eight by microstrip lines 37 by which the patches are excited with the same amplitude and the same phase at two perpendicular points 38 and 39; switching to one or the other of the two ports provides for radiation (or reception) with H or V polarization, with a cross polarization figure below −20 dB in the coverage.

Each active transmit-receive module 35 implements functions combined on four chips:

the first contains a phase shifter 40 comprising two bits of phase shift (180° and 90°) operating in switching mode with a 0° to 90° phase shifter controlled by an analog voltage and an input switch 41;

the second contains the various stages of a high-power amplifier 42;

the third contains an output switch 43;

the fourth contains the various stages of a low-noise amplifier 44 and a preset attenuator 45.

These chips are bonded onto an alumina insulative substrate and interconnected by thermocompression of gold wires with a diameter of 17 μm and a length less than 50 μm.

The silicon logic chips providing the interfaces between the power supply/control functions and the microwave functions are also integrated in the same package, which has dimensions of 18×40×50 mm.

A custom design interface provides the duplicated coaxial connection to the printed-circuit radiating elements and mutual mechanical fixing.

The other circuits shown in FIG. 3 are:

a switch 46 followed by several subarray distributors 47, this switch receiving radar pulses during transmission and outputting echoes during reception;

a pointing control computer 48;

a switch control circuit 49;

a DC power feed 63.

As shown in FIG. 4, the printed-circuit radiating elements are grouped into subarrays 51 each comprising three columns 52 of elements and 32 lines 53 of elements. The length 32 of the antenna 30 is divided between three folding arrays 54, 55 and 56. On the back of each subarray is a distributor 47 which is therefore associated with 96 active modules.

The radar transmits and receives alternately, using horizontal or vertical polarization.

This requires the use of two successive switching devices (or an isolating device and a switching device) between the amplifiers and the transmitter-receiver:

a Transmit/Receive switch or circulator, an H/V polarization switch.

The benefit of the active antenna is to place the amplifiers as close as possible to the radiating elements in order to reduce losses between them, such losses requiring a higher transmit gain and power and increasing the receive noise factor.

These two devices are both of a critical nature:

the circulators cannot be integrated in MMIC form in their conventional implementation relying on the non-reciprocal properties of ferrites;

the integrated switches have high losses and are difficult to optimize simultaneously for high power (transmission) and low noise factor (reception).

Figure 5:
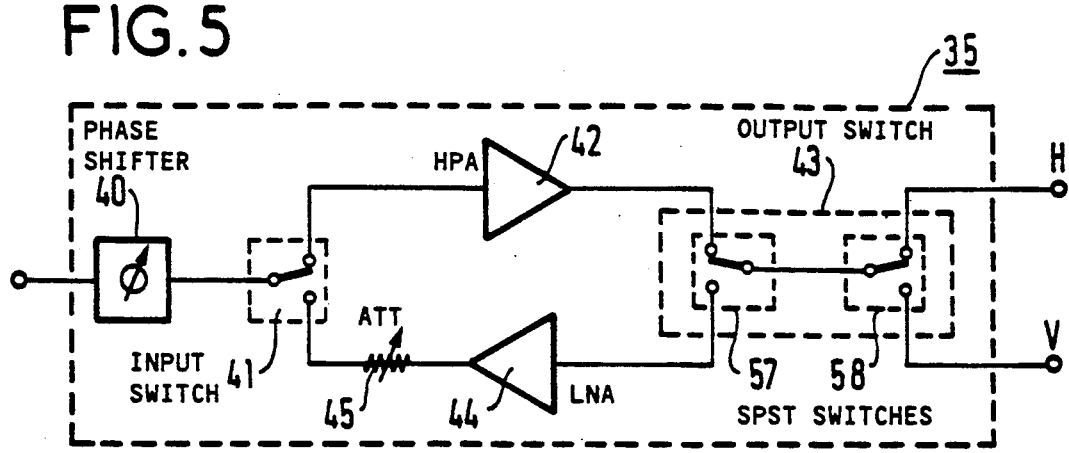
Figure 6:
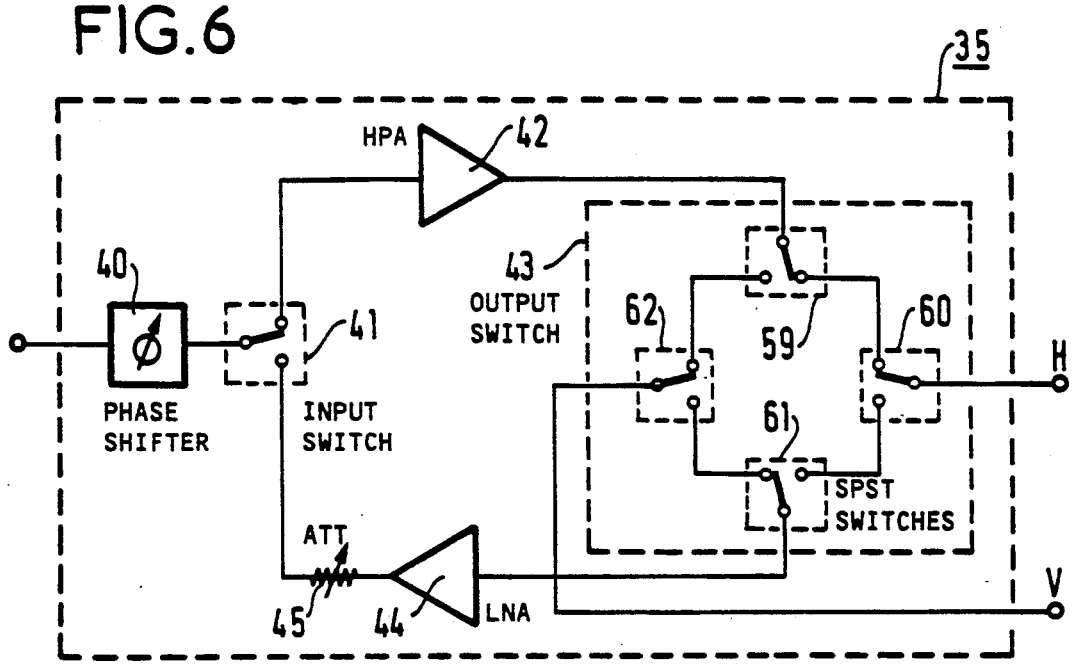
Figure 7:
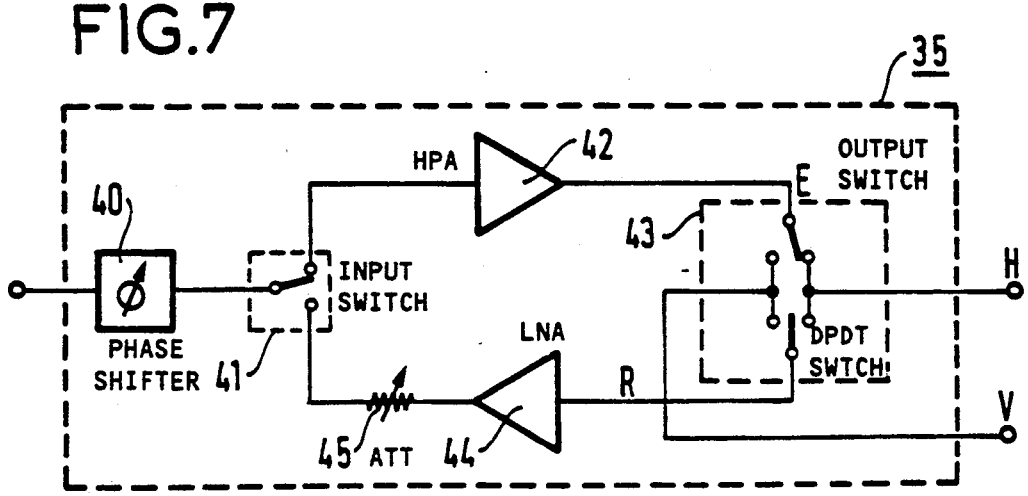

Three architectures can be used to implement this dual switching function, as shown in FIGS. 5, 6 and 7:

the first two solutions use two SPDT (single-pole/-double-throw) switches 57, 58 or four SPDT switches 59, 60, 61, 62 which introduces the losses of two switches in transmission and in reception, the third, and novel solution uses a DPDT (double-pole/double-throw) switch which introduces losses comparable with those of one switch for each operative path.

Figure 8:
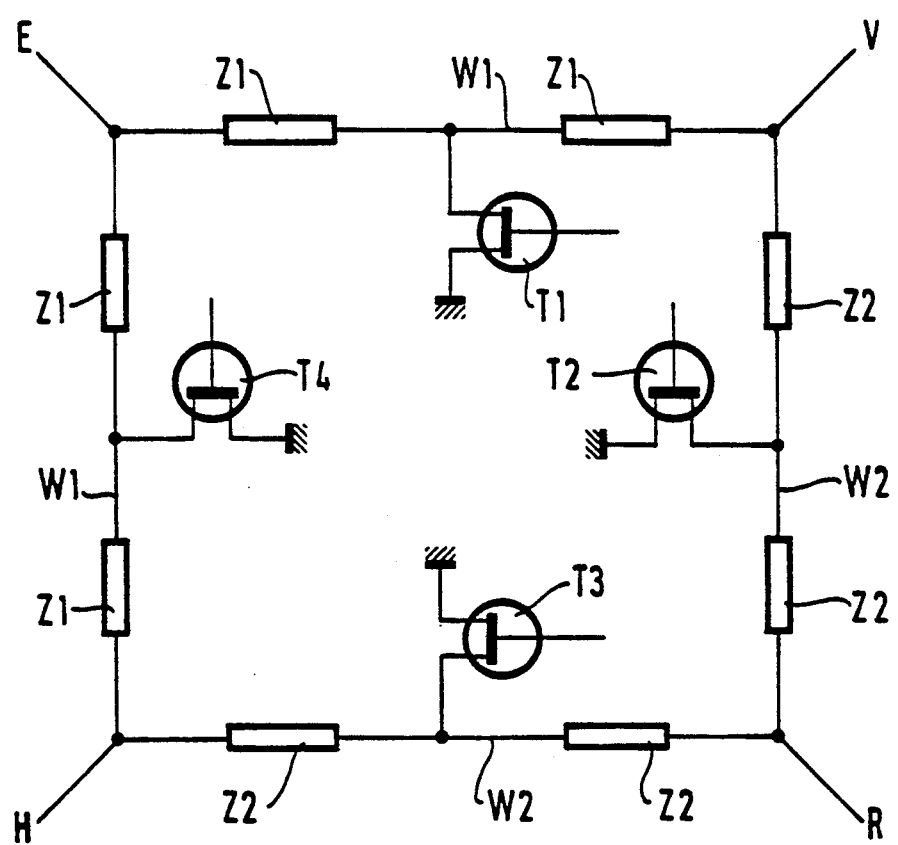

In the implementation shown in FIG. 8 the losses are due primarily to the imperfect insulation properties of the field effect transistor shunting the nominal path to ground; the three field effect transistors on the other branches are turned on and isolate the unused two ports. In FIG. 8 four field effect transistors T1, T2, T3 and T4 shunted to ground operate as switches (they are turned on or off according to the voltage applied to the gate).

W1 and W2 are the widths of the connecting lines (on gallium arsenide). Z1 and Z2 are matching impedances.

A switch of this kind is entirely suitable for monolithic (MMIC) integration.

The distributor 47 is a triplate distributor which connects the various Tx/Rx modules 35 (these are active transmit-receive modules) by a series of photo-etched tracks between two dielectric layers and two ground planes. Each distributor comprises dividers in the form of 3 dB couplers and a loaded gate which absorbs some spurious reflections.

There are six triplate distributors behind each subarray, three of which are used for nominal operation (distribution in transmission and summation in reception) and three for calibration (summation of signals sampled on transmission by −30 dB couplers at the Tx/Rx module outputs).

The invention enables the antenna to be subdivided into modular subarrays.

Figure 9:
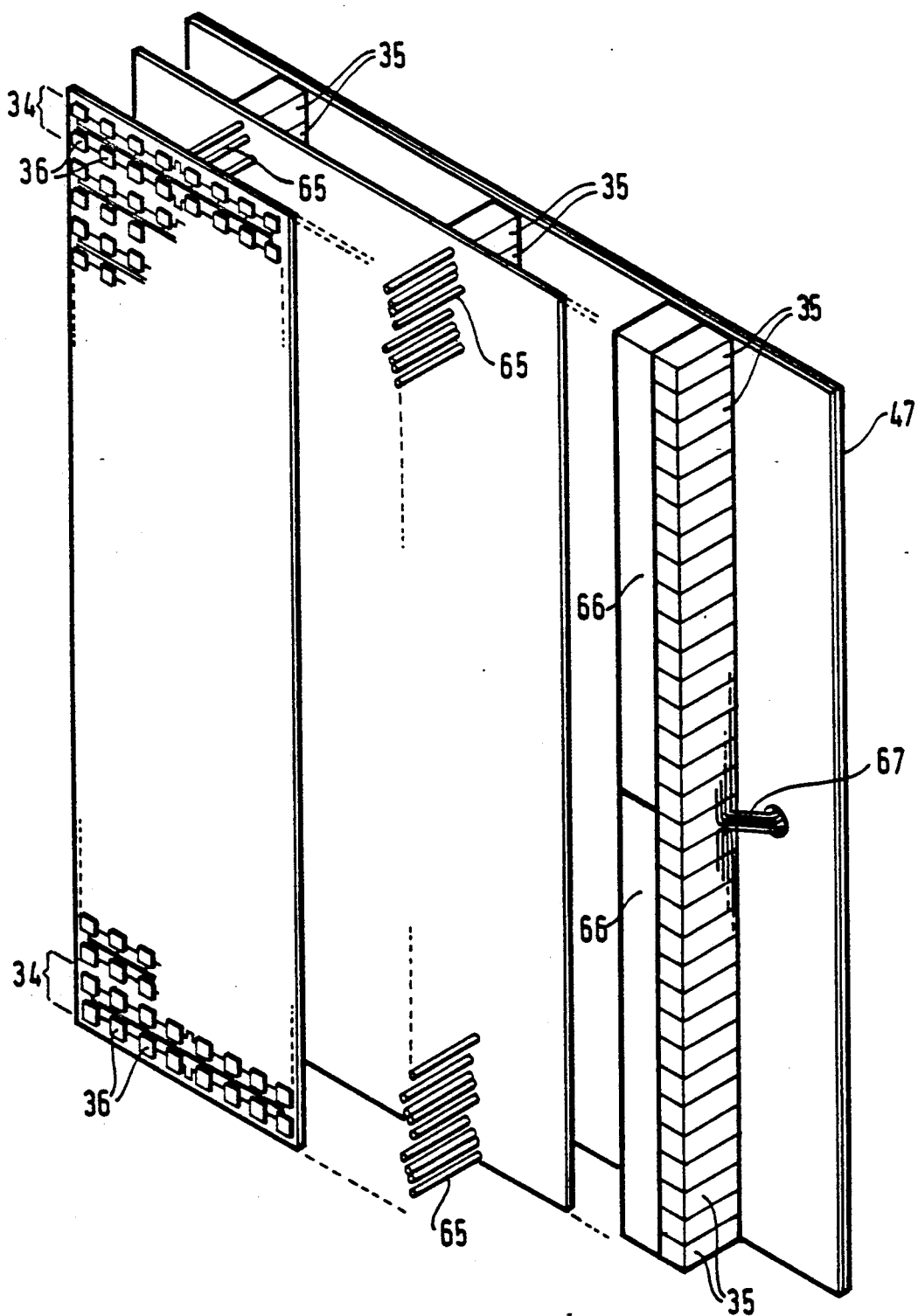

FIG. 9 is an "exploded" view of a subarray showing:
the patches 36,
the printed-circuit radiating elements 34,
coaxial cables 65,
the active modules 35,
the triplate distributors 47,
power feeds 66,
control lines 67.

The dimensions of the subarrays are in the order of 50×50 cm for the following reasons:

copperclad laminated insulated substrates of this size can be photo-etched in one piece, which facilitates the implementation of the radiating plane and the triplate distributor;

each subarray represents only one 50th to 100th part of an antenna and is manufactured at low cost, with a limited number of spares for last minute repairs during integration;

an intermediate amplification level ("primary" modules) is provided at the rear input of a subarray, which simplifies the implementation of the secondary module by limiting the amplifier gain to 35 dB in the case of the high-power amplifier and 25 dB in the case of the low-noise amplifier.

The same series manufactured MMIC chips used for the secondary modules (behind the patches) can be used for the primary modules (behind the subarrays), except for the phase shifter 40 which is not needed in the latter application and for the attenuator 45 which needs a wider dynamic range.

A primary module failure, resulting in a coherent hole in the antenna illumination, degrades the antenna diagram more than secondary module failures distributed at random over the antenna. Also, the small number (68 in this example) of primary modules are redundant; this is not necessary for the secondary modules, for which random failures of up to 5 to 10% can be tolerated.

Figure 10:
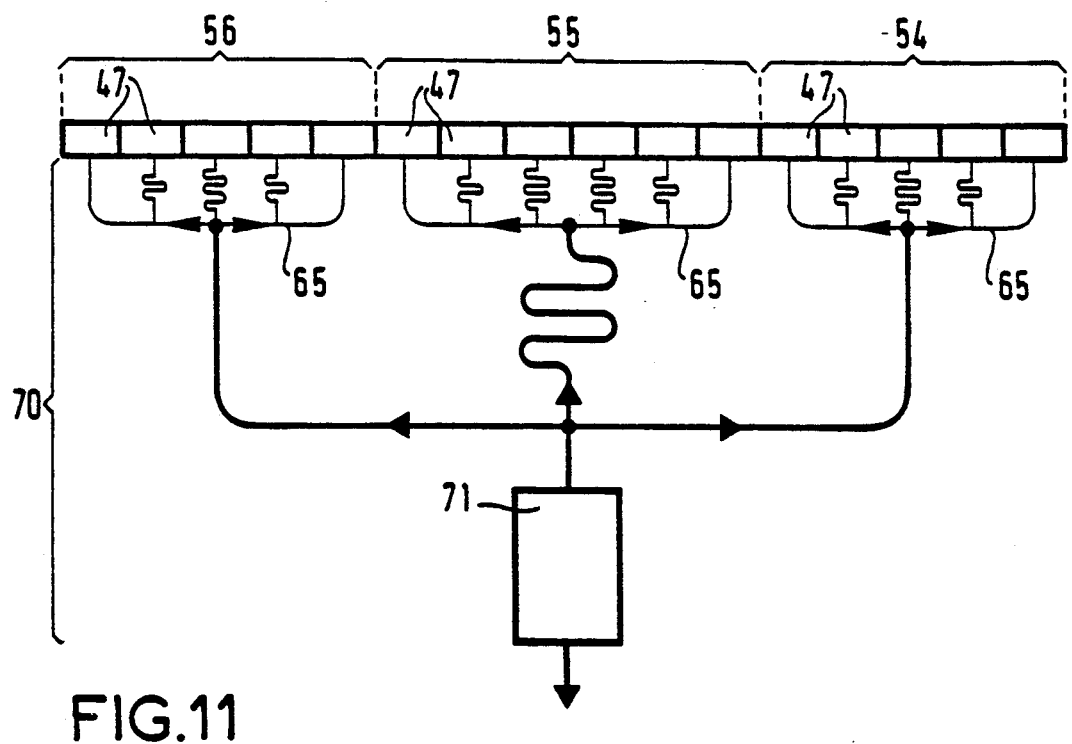
Figure 11:
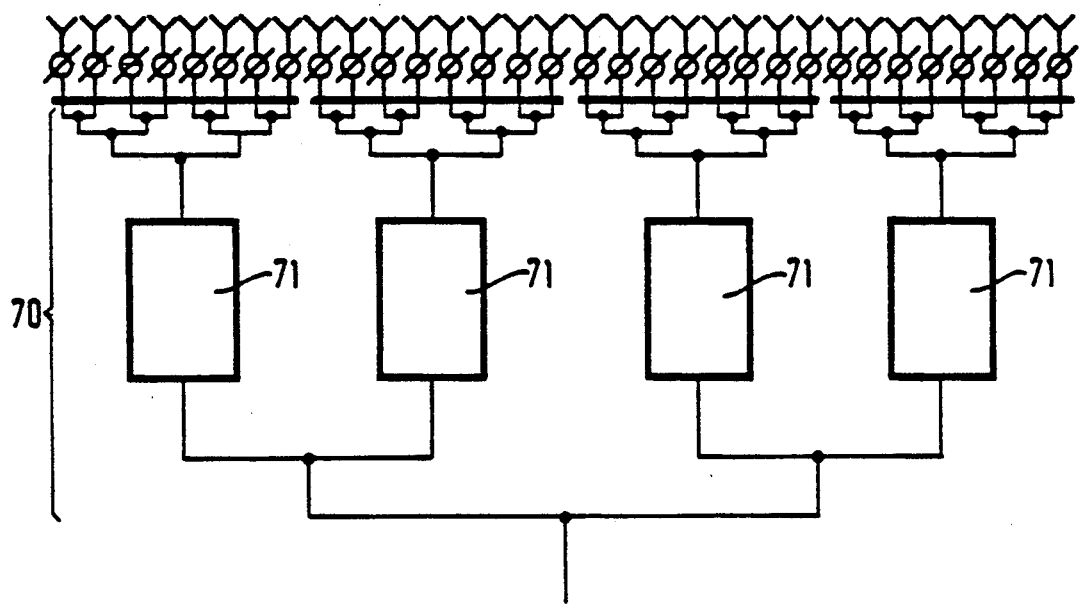

The subarrays are interconnected by a coaxial primary distributor 70 shown in FIGS. 10 and 11 in horizontal and vertical cross section. It comprises four sets of selectively operable delay lines 71 to avoid depointing of the beam during modulation of the frequency for observations far away from the normal to the antenna.

Figure 12:
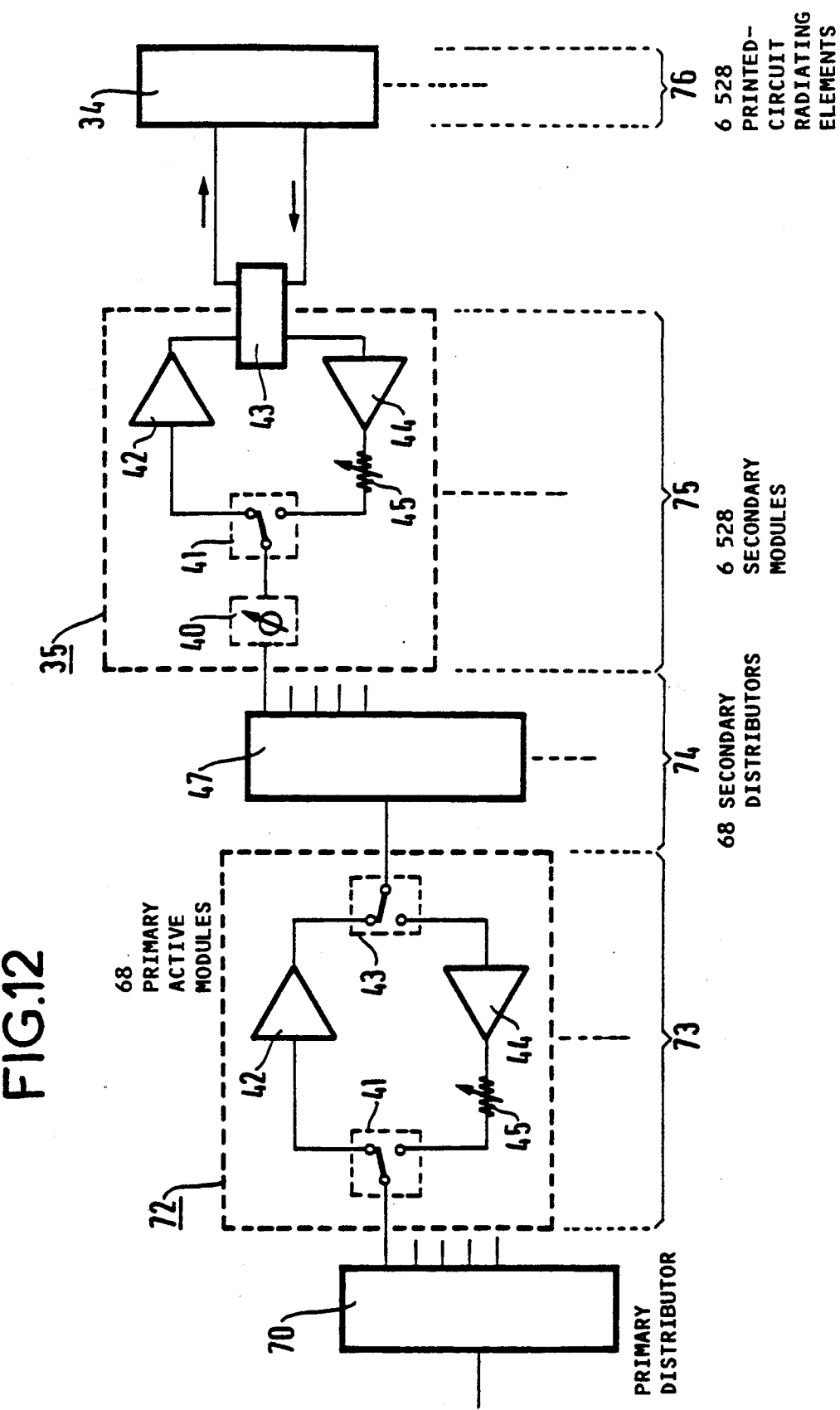

FIG. 12 is a block diagram of the antenna shown in FIG. 3.

It shows:
a primary distributor 70;
68 primary active modules 72 (73) which do not comprise any phase shifters (these modules are redundant);
68 secondary distributors 47 (74);
6,528 secondary modules 35 (75) immediately behind the patches;
6,528 printed-circuit radiating elements 34 (76).

With reference to the mechanical structure:
the choice of particularly lightweight materials (suitable for spaceflight applications and with sufficient structural stiffness for the mechanical structures) makes it possible to limit the mass of the active antenna, for the dimensions specified previously, to 700 kg which is compatible with space applications:
triplate distributors and radiating planes in glass-PTFE-ceramic 0.8 mm thick, bonded to an aluminum honeycomb/aluminum skin sandwich panel;
carbon fiber+aluminum honeycomb plate sandwich secondary structure;
carbon fiber bar primary structure.

Figure 13:
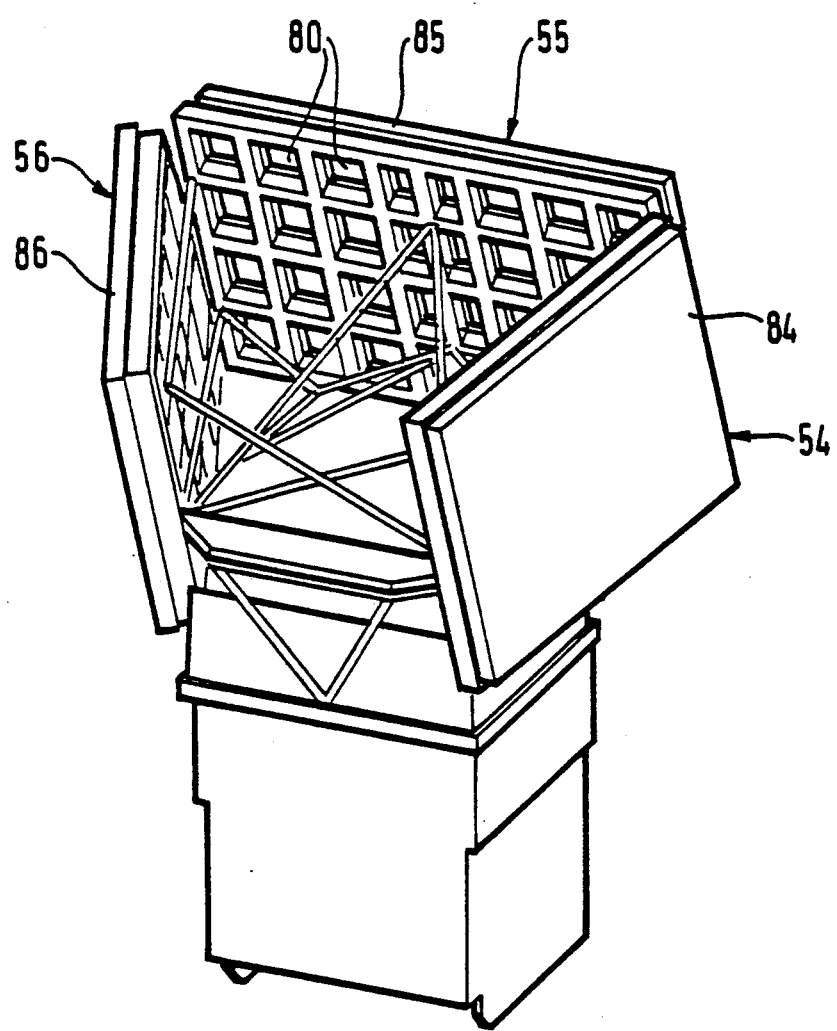

Good flatness is obtained for each array by a grid mechanical structure 80 as shown in FIG. 13; this structure is a rigid support for the subarrays previously described, but a system of (thermo-elastic) flexible links between these two structures means that expansion of one structure does not affect the other and ensures the flatness of the antenna that is essential if its diagram is not to deteriorate.

The subarrays are combined into arrays that are folded for launch and deployed in orbit: there are three folding arrays 54, 55 and 56 in this example, compatible with the satellite platform and the fairing of the Ariane 5 launch vehicle.

The microwave link between the subarrays and the satellite platform is provided by low-loss flexible coaxial cables compatible with deployment of the arrays.

In FIG. 13 the various antenna electronic subsystems previously described are denoted by the reference numbers 84, 85 and 86.

Thermal control: the active modules are cooled by conduction and radiation of heat within the subarrays and radiated in a forward direction away from the front of the antenna via a thin radome, painted white, in front of the radiating plane, thereby ensuring proper heat exchange at the front of the antenna, because heat is radially radiated in the forward direction while avoiding absorption of solar radiations in the visible separation and neighboring spectrum (ultraviolet and infrared) by reflection of incident light.

The edges and the back of the antenna are covered with "super-insulation" as their exposure to the sun varies considerably during a "9h30/21h30" type heliosynchronous orbit (times at which the sun crosses the equator), especially due to shadowing by the platform and structures.

The maximum thermal gradient at the antenna at any time is kept below 5° C., which is essential to avoid deformation of the diagram due to temperature-dependent variations in the active module insertion phase and gain.

During the orbit the temperature of the MMIC modules varies between −10° C. (there is provision for heating them at the end of standby periods) and +14° C., which is highly beneficial with regard to their noise factor and reliability.

To prevent the temperature gradients exceeding those specified and causing deformation of the antenna such that the diagrams are not seriously degraded there is provision for electronic compensation of distortion (flatness imperfections):

a laser sighting system on the satellite platform is aimed at small mirrors judiciously located on the antenna, a central computer corrects the phase shifter control signals to correct phase errors caused by such deformation.

Part A of FIGS. 14 through 22 shows the transmit, receive and transmit/receive diagrams. Part B shows the excitation of the corresponding sources (N lines of patches). These are typical diagrams obtained with an equal-amplitude transmit illumination law and a receive attenuation preset to four levels only in the case of the secondary modules.

The curves 80 and 81 in part A of these figures are respectively the specified exterior and interior limiting curves.

Figure 14A:
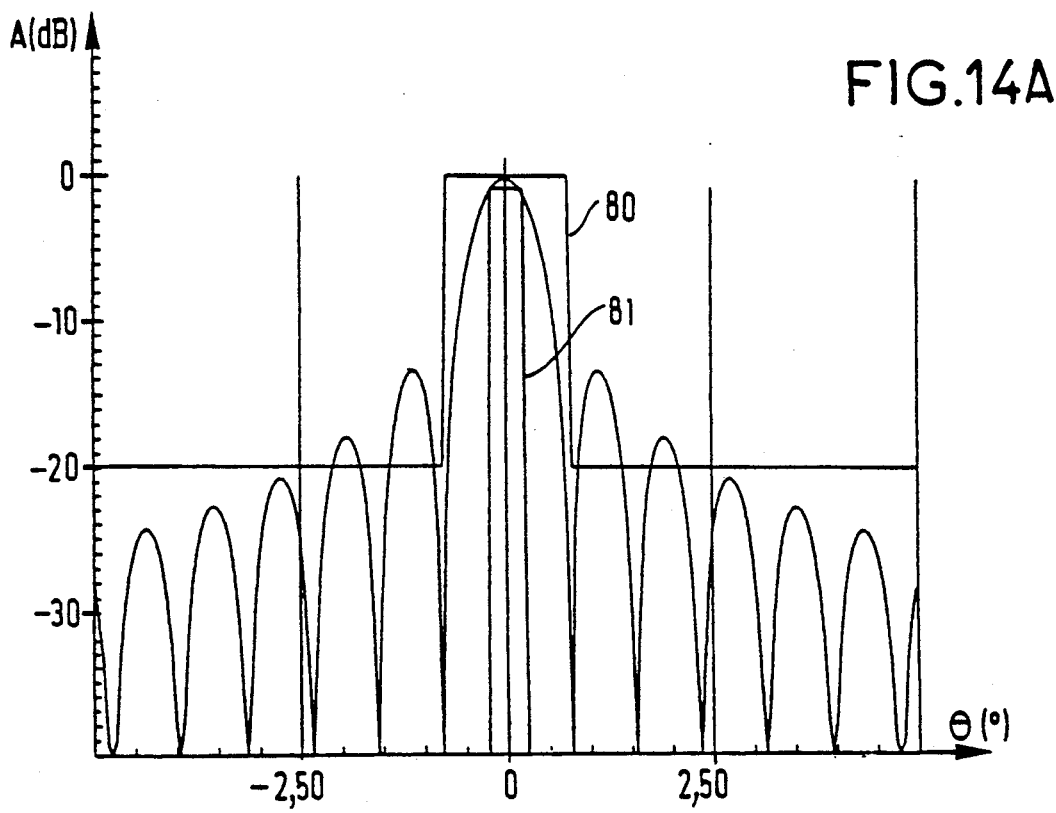
FIGS. 14A, 14B, 15A, 15B, 16, 17A, 17B, 18A, 18B, 19, 20A, 20B, 21A, 21B and 22 show transmit and or receive diagrams (in part A) illustrating the operation of the antenna system and the excitation curves of the corresponding sources (in part B).
Figure 14B:
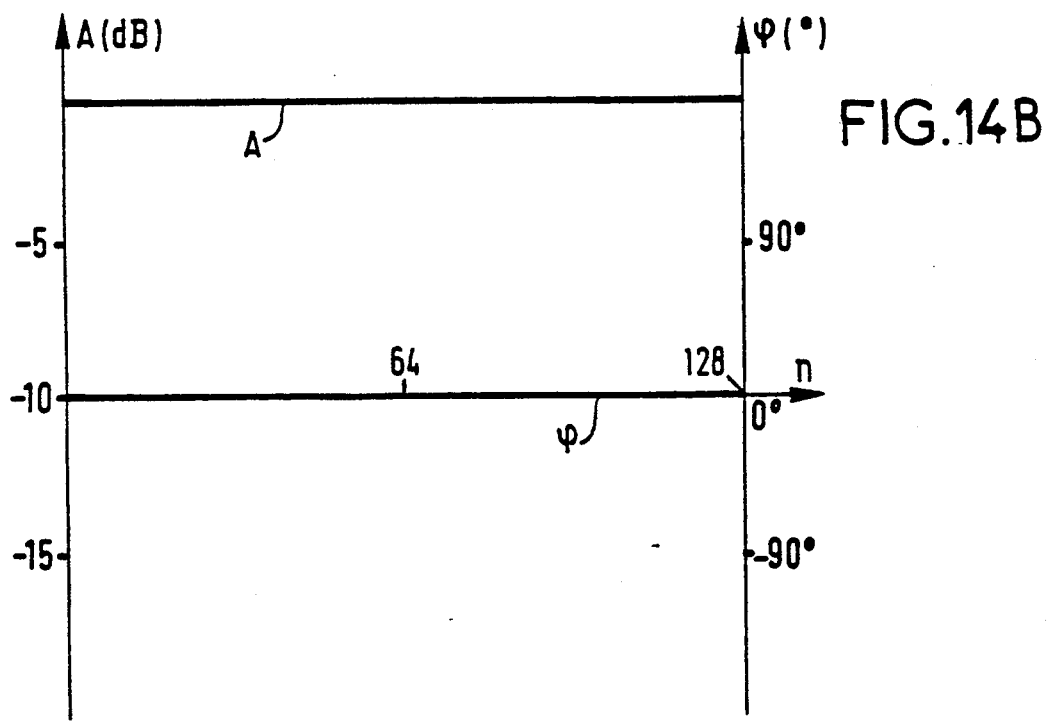
Figure 15A:
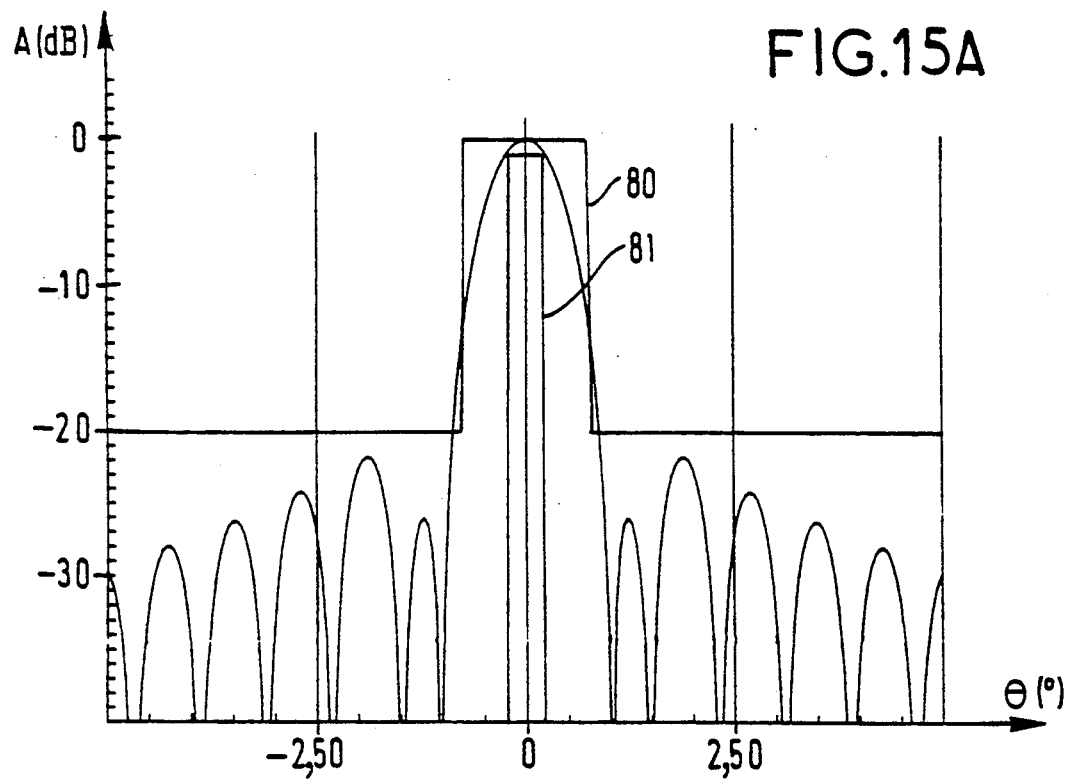
Figure 15B:
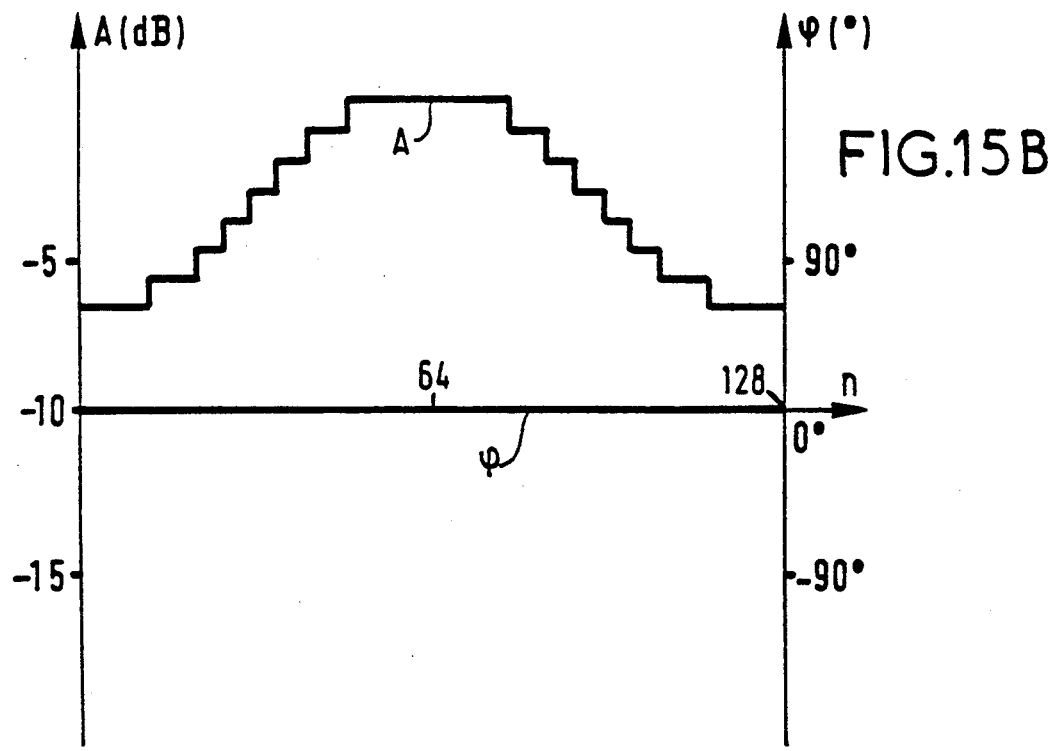
Figure 16:
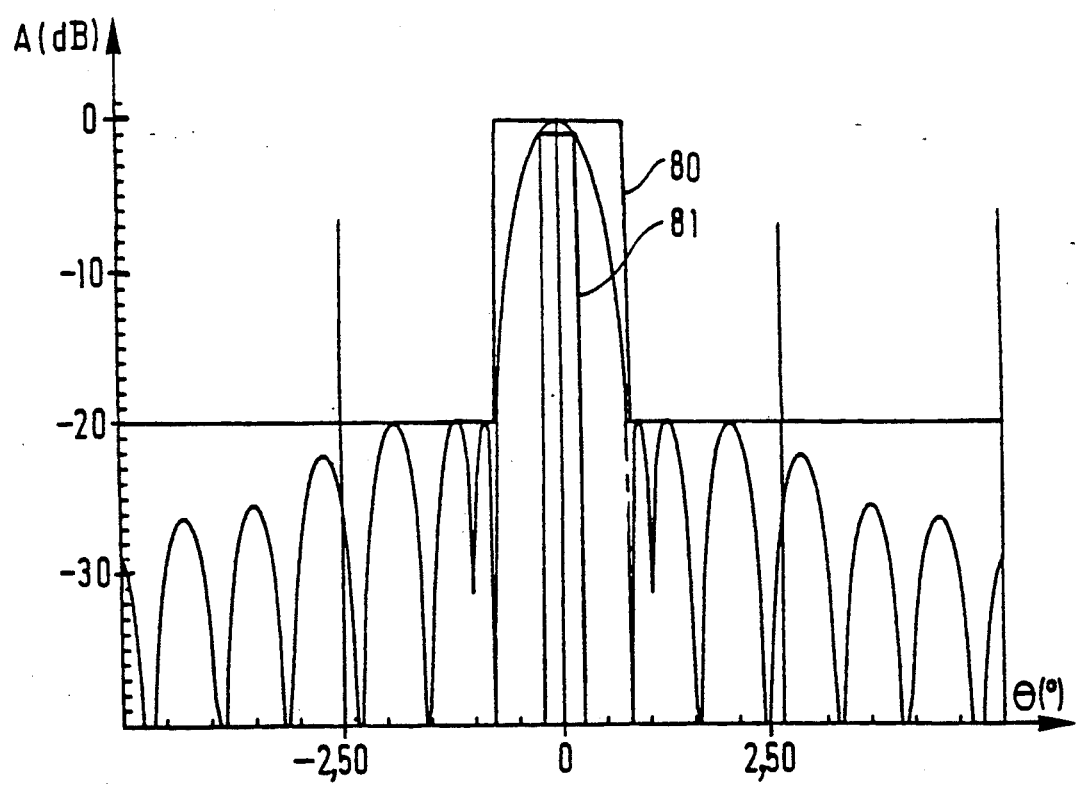

FIGS. 14 and 15 show the narrowest elevation transmit and receive diagrams $G_e$ and $G_r$ obtained with equal-phase illumination. FIG. 16 shows the equivalent transmit-receive diagram $\sqrt{G_e G_r}$ procuring the same radar performance.

For a secondary lobe level of around $-20$ dB, the diagram has a main lobe thinner at the base than the best diagrams which can be obtained with identical illumination for transmission and reception: for a given usable aperture (0°41 at $-0.9$ dB in the example), this produces a slightly shorter antenna and reduces radar ambiguity.

Figure 17A:
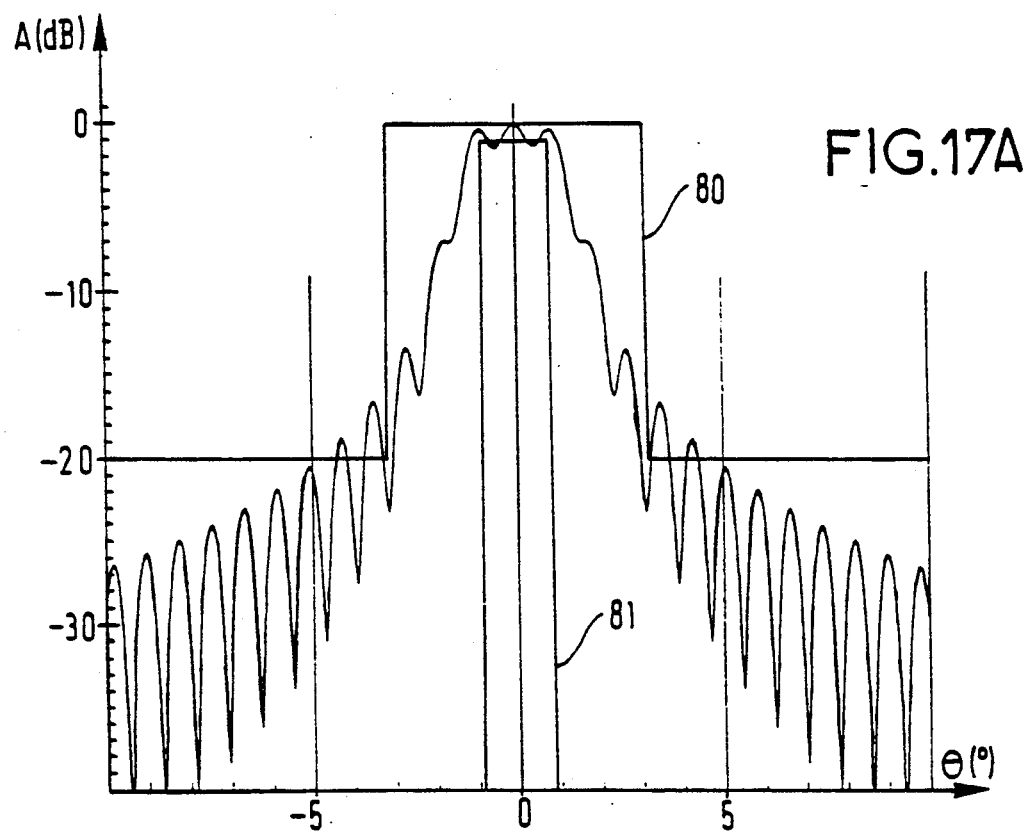
Figure 17B:
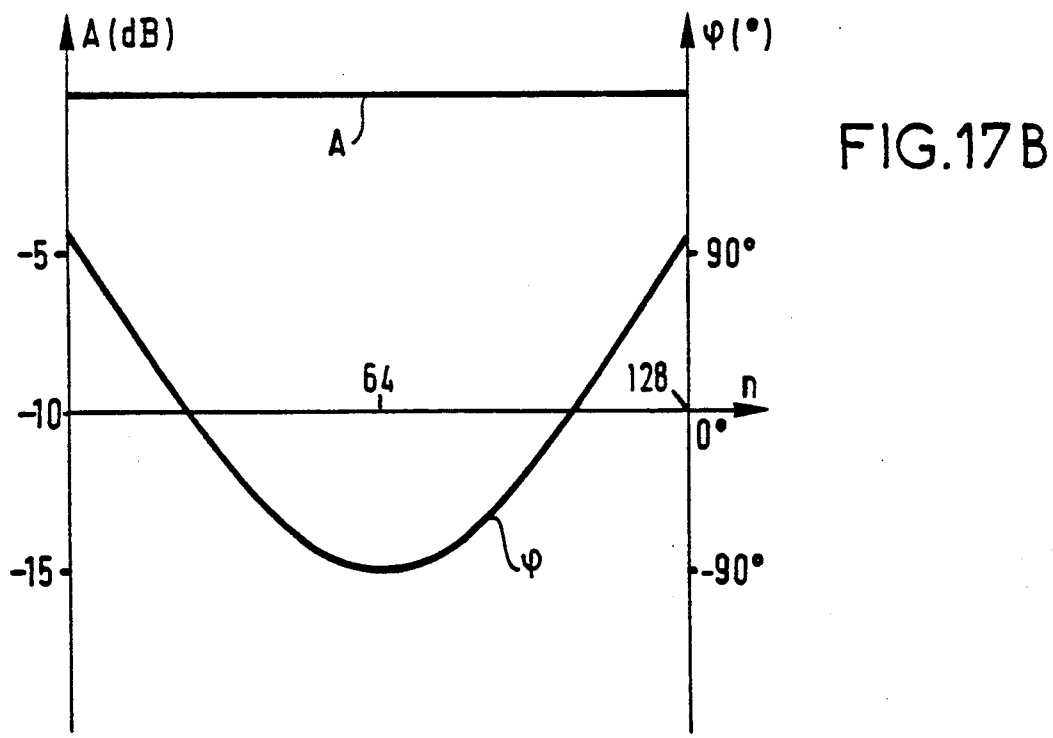
Figure 18A:
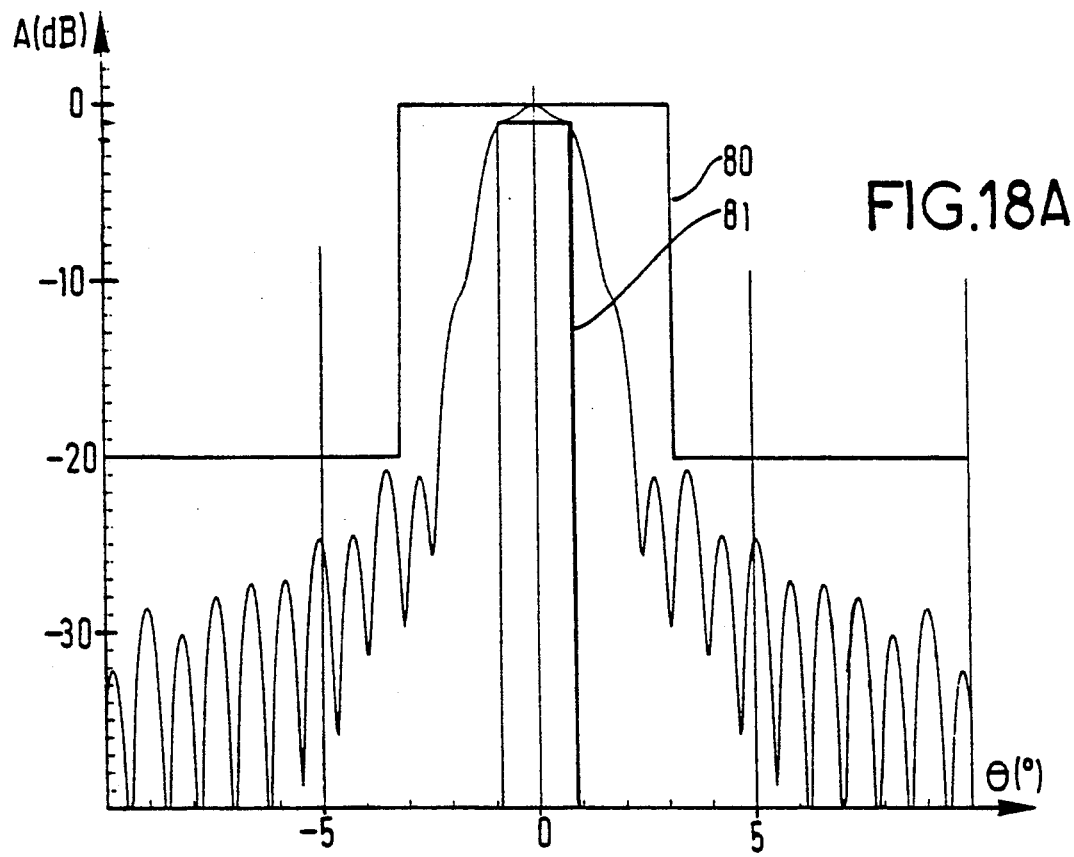
Figure 18B:
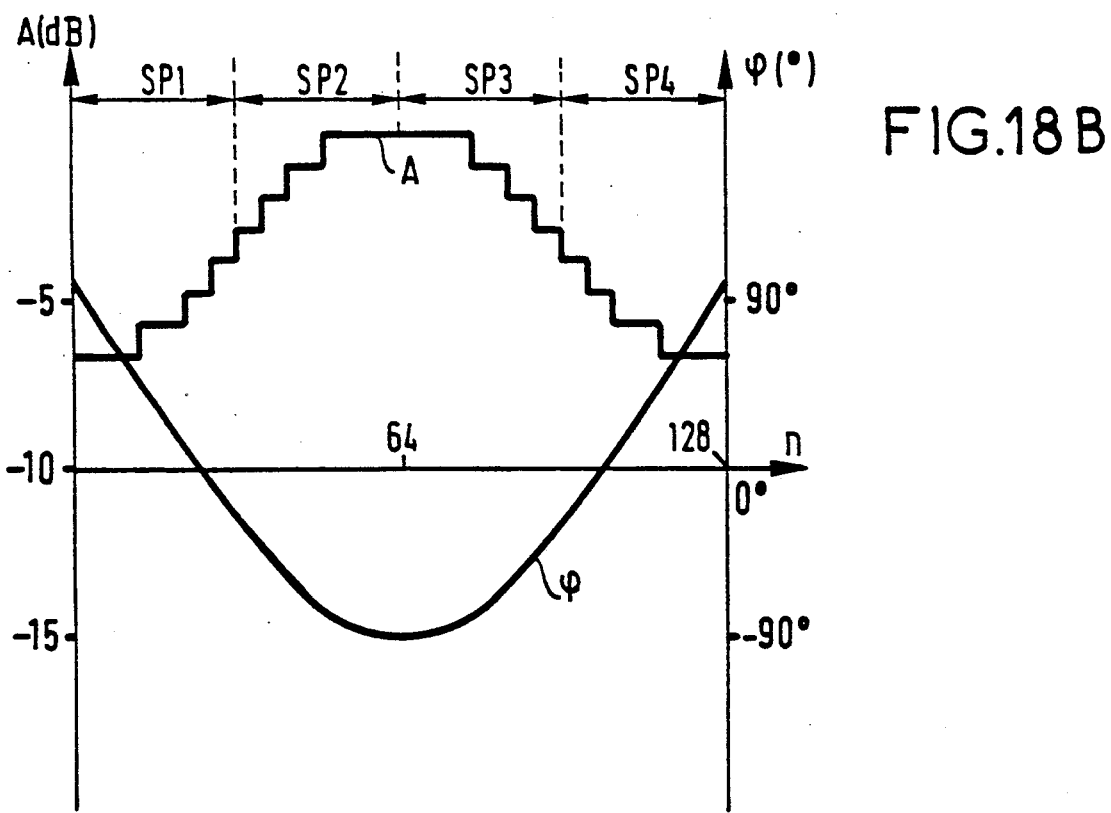
Figure 19:
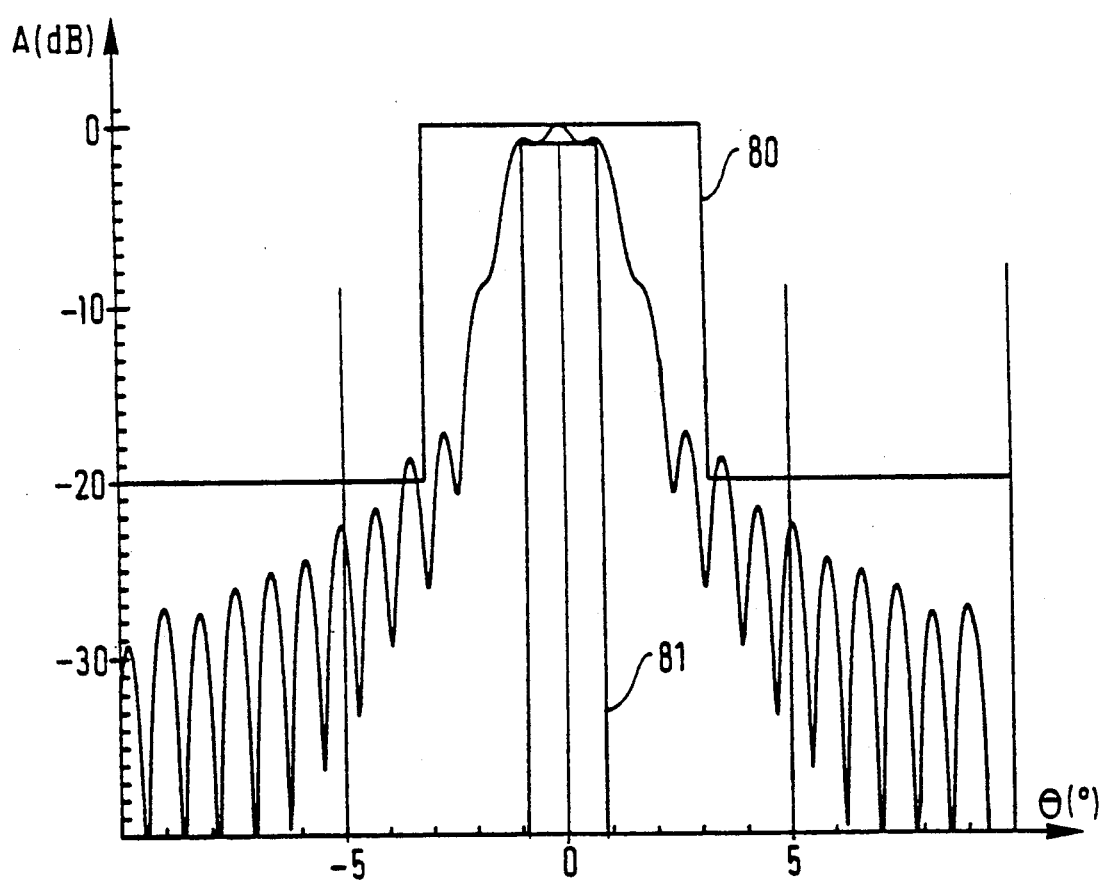
Figure 20A:
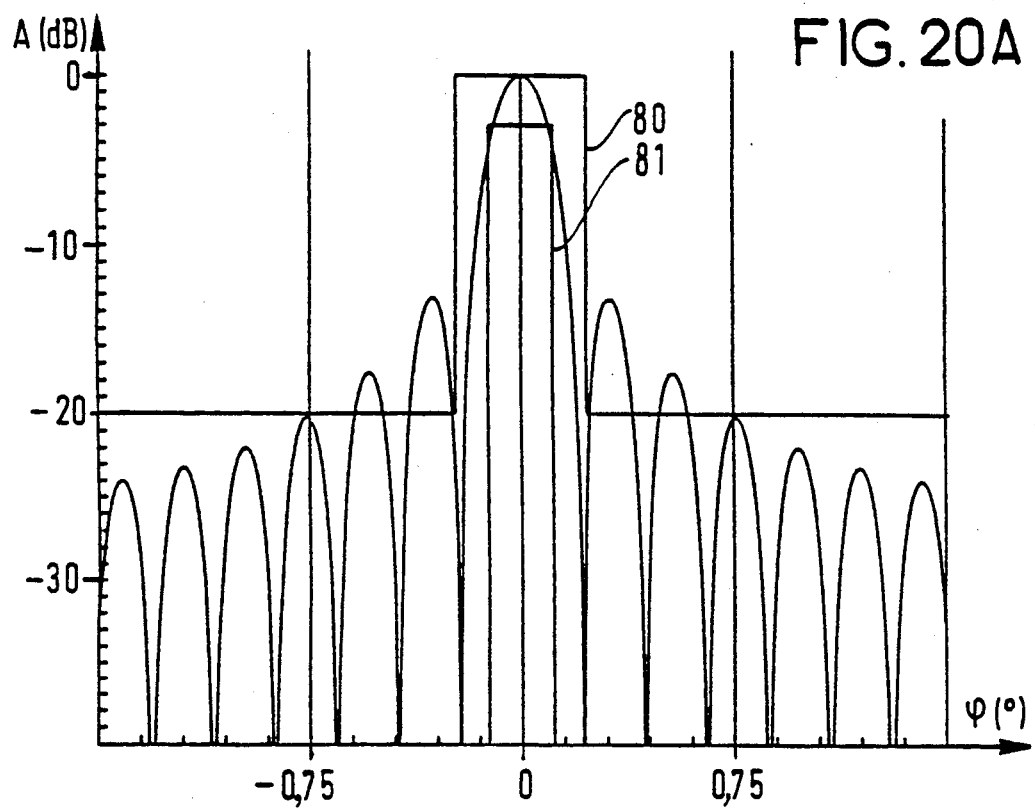
Figure 20B:
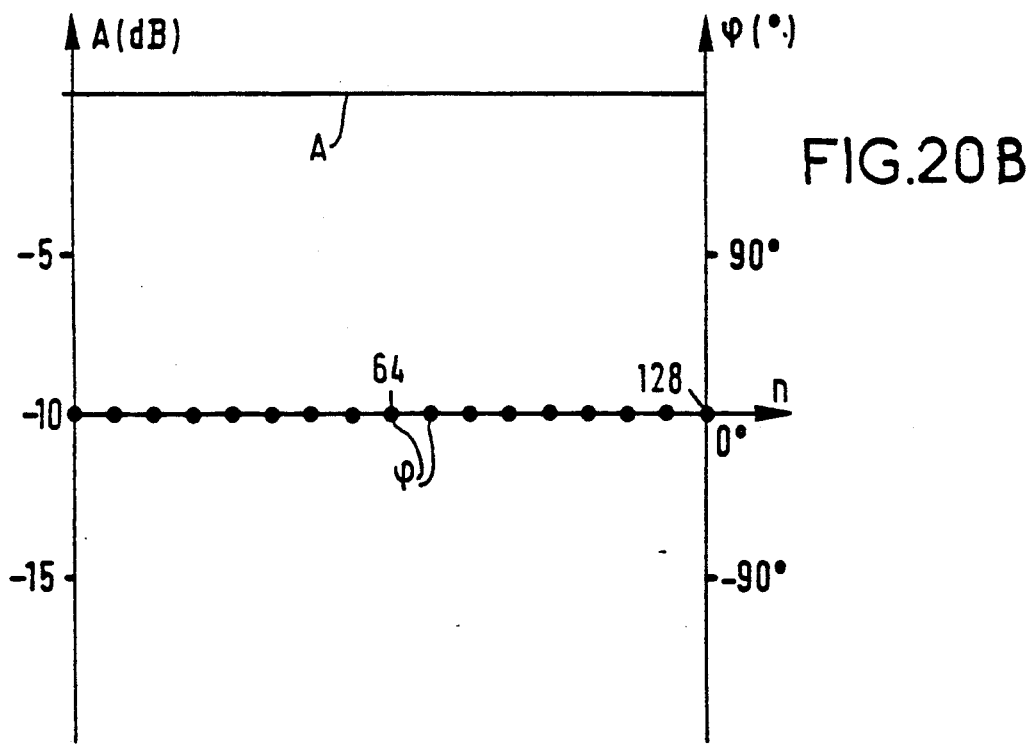
Figure 21A:
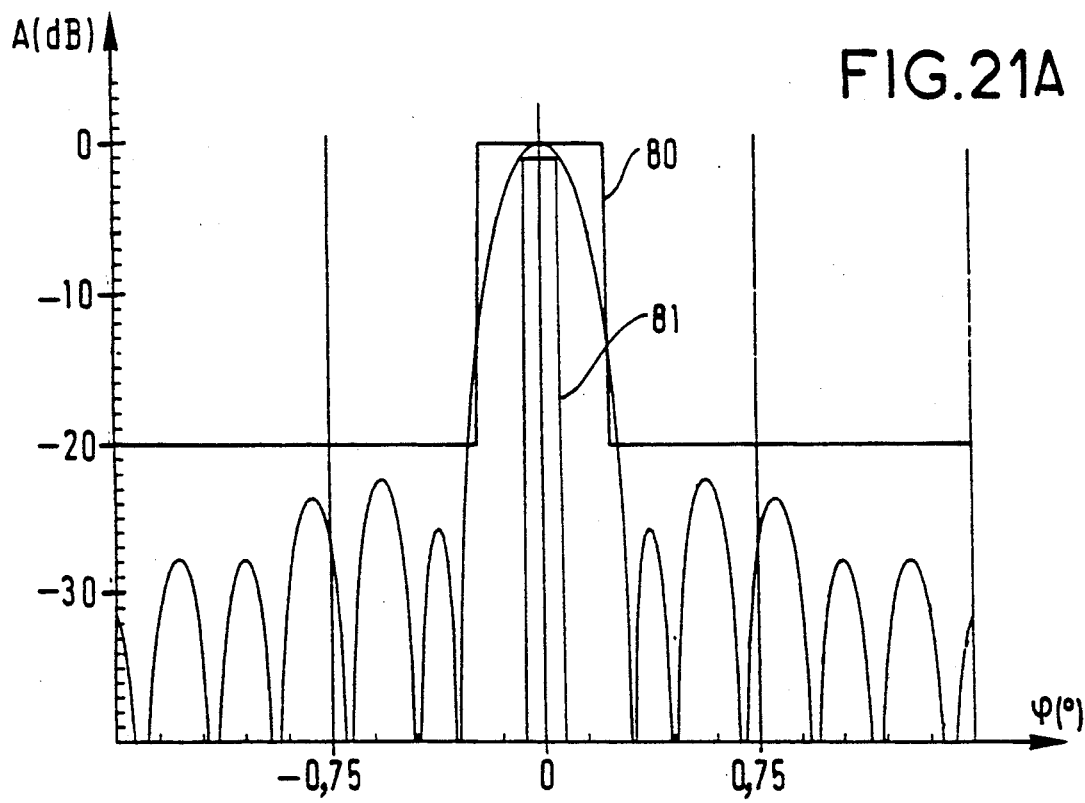
Figure 21B:
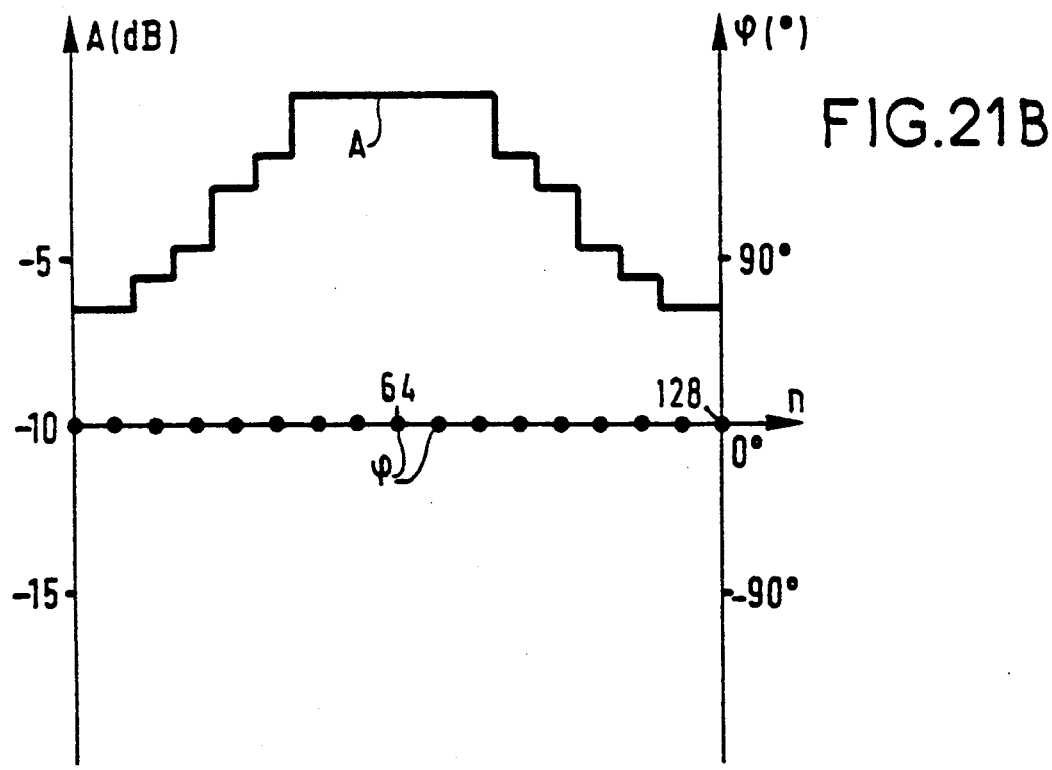
Figure 22:
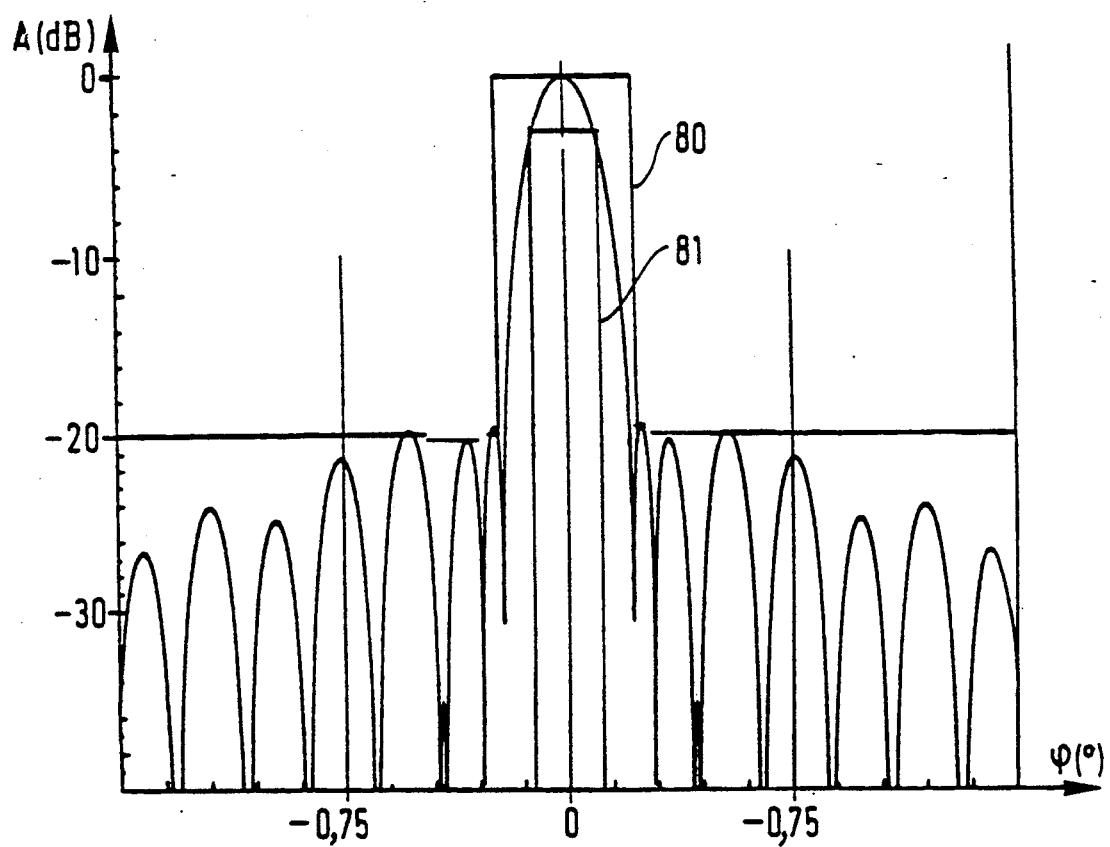

Adding a parabolic type phase law generates wider lobes without having to change the amplitude laws. FIGS. 17 through 19 show the example of a lobe with a usable width of 1°69, which is 4.15 times that of the thin lobe. This modulation of the lobe width makes it possible to maintain constant the width of the strip of the earth's surface intercepted by the usable part of the lobe when the boresight angle is varied by electronic scanning in elevation; this is achieved by adding a linear phase to the height of the antenna.

The azimuth diagrams are always the narrowest possible (FIGS. 20 through 22), which makes it possible to minimize the length of the antenna. They are achieved with a constant attenuation for each subarray, with the same increment (0.93 dB) as on the height of the antenna.

This makes it possible to achieve on the antenna surface a "separable" illumination, the product of horizontal and vertical laws: these laws remain constant for any cross-section of the antenna parallel to its axes.

Only four levels of attenuation are required within a subarray, as shown in FIG. 15; the reduced dynamic range (2.8 dB) avoids distortion of the phase law when the attenuators are adjusted.

Rotation by 180° in the plane of the antenna converts an SP1 type subarray to an SP4 type subarray and an SP2 type subarray into an SP3 type subarray. Adjusting the subarray active module attenuator according to its position on the antenna changes from an SP2 subarray to an SP1 subarray or from an SP3 subarray to an SP4 subarray ($-3.72$ dB), and additionally enables the implementation of the illumination law on the antenna length.

The primary module attenuator must therefore be variable over 12 levels (dynamic range 10.2 dB); any modifications of the insertion phase due to this adjustment are calibrated and taken into account by the onboard computer, being added to the depointing and widening phases to control the phase shifters.

This system makes it possible to use identical subarrays with only two different types of adjustment of the attenuators in the Tx/Rx vertical columns. Only the primary module to the rear requires adjustment in the event of replacing a subarray.

The high-yield active printed-circuit antenna system has been described in detail for a specific X band transmission.

The same general principles and the same architecture can be applied to other microwave bands or to other diagram specifications; only the dimensions and the number of active modules vary.

Instead of placing a passive FET attenuator on the output side of the low-noise amplifier 44, the final stage of the LNA may be replaced with a dual-gate FET: varying the voltage on the second gate varies its gain.

This solution reduces the variation of insertion phase with attenuation and enables a higher gain dynamic range if needed (up to 20 dB).

In the current state of the art the output part of the MMIC technology high-power amplifier 42 does not exceed some 1 to 3 W. If higher power is required, with regard to the numbers of Tx/Rx modules, a final "hybrid" SSPA stage, i.e. a stage fabricated on a different substrate with its own matching circuits, can be added.

Figure 23:
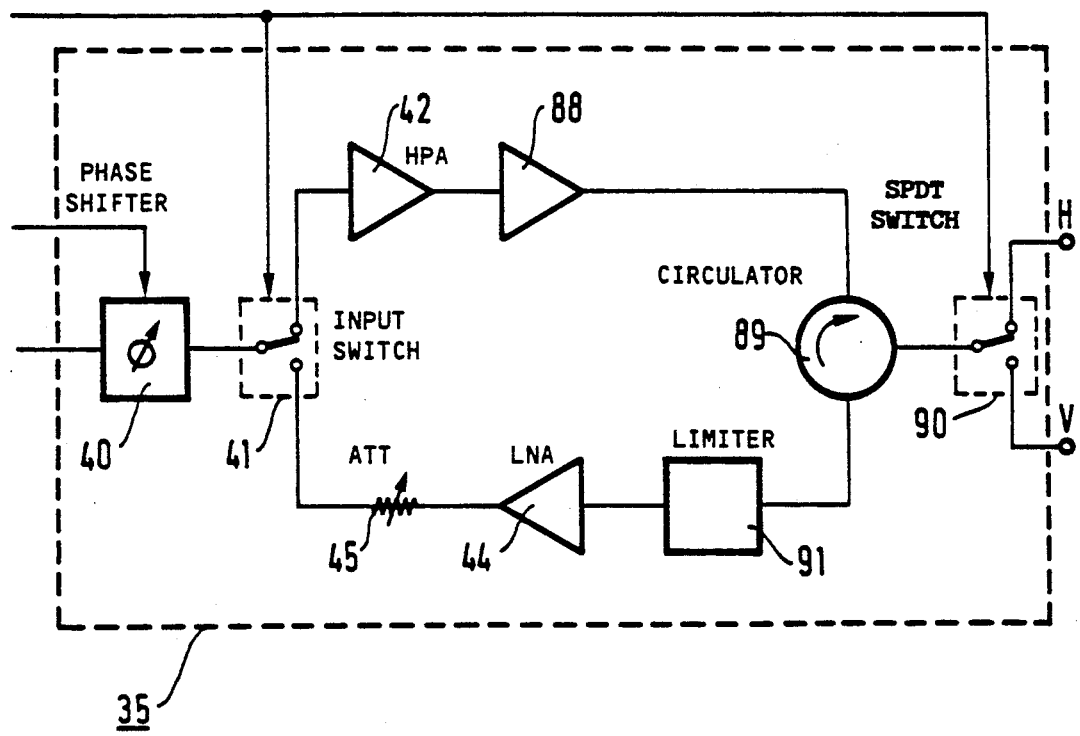
FIG. 23 shows an alternative embodiment of an active an antenna system in accordance with the invention.

In this case the use of the DPDT switch may be a problem because of the transmit power to be supported. In this case (see FIG. 23), a circulator 89 is advantageously employed followed by a PIN diode SPDT switch 90. In this case the low-noise amplifier 34 must be protected by a limiter 91 from the energy from the SSPA stage reflected from the radiating elements if the latter are not perfectly matched.

The receive channel gain can be varied by an attenuator 45 or by a variable gain low-noise amplifier 44, as previously explained.

It is to be understood that the present invention has been described and shown by way of preferred example only and that its component parts can be replaced by equivalents without departing from the scope of the invention.

There is claimed:

1. High-yield antenna system including an active printed-circuit planar antenna for pulsed frequency-hopping space radar electronically scanned in two planes, its timing diagram encompassing the transmission of a horizontal polarization pulse, the reception of echoes from a previous horizontal polarization pulse, the transmission of a vertical polarization pulse and the reception of echoes from a previous vertical polarization pulse, said system comprising, distributed on insulative substrates, several thousand MMIC active transmit-receive modules, each of which contains a switching device, amplifier means and a phase shifter, and each of which is connected to one of a plurality of printed-circuit radiating elements, each printed-circuit radiating element comprising a plurality of dual polarized square patches connected by microstrip lines adapted selectively to excite the patches with the same amplitude and the same phase at two perpendicular ports coupled to said switching device, said switching device switching between said two ports for selectively procuring transmission or reception with horizontal or vertical polarization.

2. Antenna system according to claim 1 wherein each MMIC active module has an output power of 1 W or less.

3. Antenna system according to claim 1 wherein the active modules of said antenna system are subdivided into modular subarrays to be assembled together.

4. Antenna system according to claim 1, further comprising a plurality of redundant transmit-receive MMIC active modules each containing a switching device and amplifier means, and wherein identical integrated circuits are used in said redundant active modules and in said active modules which are disposed immediately behind the radiating elements.

5. Antenna system according to claim 1 wherein said switching device comprises a double-pole/double-throw switch implementing transmit/receive and horizontal/vertical polarization switching functions.

6. Antenna system according to claim 1 wherein the active modules are implemented in hybrid technology and comprise an output circulator.

7. Antenna system according to claim 1 further comprising primary and secondary mechanical structures for supporting the antenna comprising: very lightweight materials suitable for spacecraft applications, such lightweight materials having sufficient structural stiffness to limit deformations of the antenna to less than 2 mm for a planar antenna larger than 8 m×2 m; and a thermo-elastically decoupled link system between said primary and secondary mechanical structures of the antenna system.

8. Antenna system according to claim 1 comprising multi-layer insulation at a rear and edges of the planar antenna, and a white-colored randome adapted to radiate heat in a forward direction away from the front surface of the planar antenna.

9. Antenna system according to claim 1 comprising a laser sighting system, mirrors distributed over the antenna, and a computer for correcting control signals applied to the phase shifters in the active modules for compensating for deformations of the antenna.

10. The antenna system according to claim 1 wherein the number of said MMIC modules is more than 6,000, wherein the number of said patches and said microstrip lines is more than 49,000, wherein said planar antenna has a surface area of 18.6 m$^2$, wherein each combination of a radiating element and an active module occupies an area of 1.88×16 cm and wherein the antenna system has a weight equal to or less than 700 kg, so that said antenna system is compatible with space-environmental constraints such as weight, electrical energy consumption, radiation hardness, and ruggedness and robustness/reliability with respect to the module failures.

* * * * *